(12) United States Patent
Brown et al.

(10) Patent No.: US 7,162,718 B1
(45) Date of Patent: Jan. 9, 2007

(54) LANGUAGE EXTENSION FOR LIGHT WEIGHT THREADING IN A JVM

(75) Inventors: Michael Wayne Brown, Georgetown, TX (US); Scott E. Garfinkle, Autin, TX (US); Michael A. Paolini, Round Rock, TX (US); David Mark Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1124 days.

(21) Appl. No.: 09/735,592

(22) Filed: Dec. 12, 2000

(51) Int. Cl.
G06F 9/455 (2006.01)
G06F 9/45 (2006.01)
G06F 9/40 (2006.01)

(52) U.S. Cl. .................. 718/1; 717/140; 717/151; 712/207; 712/215; 712/216; 712/218

(58) Field of Classification Search .................. 718/1, 718/100–108; 717/114, 118, 148, 139–151; 712/207–218
See application file for complete search history.

(56) References Cited

U.S. PATENT DOCUMENTS

| | | | |
|---|---|---|---|
| 5,050,070 A | 9/1991 | Chastain et al. | 364/200 |
| 5,093,912 A | 3/1992 | Dong et al. | 395/650 |
| 5,159,686 A | 10/1992 | Chastain et al. | 395/650 |
| 5,504,898 A | 4/1996 | Klein | 395/650 |
| 5,551,040 A * | 8/1996 | Blewett | 717/106 |
| 5,560,029 A | 9/1996 | Papadopoulos et al. | 395/800 |
| 5,615,350 A * | 3/1997 | Hesson et al. | 712/218 |
| 5,748,934 A * | 5/1998 | Lesartre et al. | 712/216 |
| 5,752,031 A | 5/1998 | Cutler et al. | 395/673 |
| 5,884,059 A * | 3/1999 | Favor et al. | 712/215 |
| 5,974,541 A * | 10/1999 | Hall et al. | 712/228 |
| 6,012,081 A * | 1/2000 | Dorn et al. | 718/102 |
| 6,314,471 B1 * | 11/2001 | Alverson et al. | 710/5 |
| 6,560,626 B1 * | 5/2003 | Hogle et al. | 718/102 |
| 6,948,052 B1 * | 9/2005 | Nguyen et al. | 712/207 |
| 2001/0049747 A1* | 12/2001 | Stanbach | 709/245 |
| 2002/0092004 A1* | 7/2002 | Lee et al. | 717/140 |
| 2004/0031018 A1* | 2/2004 | Marty | 717/120 |
| 2004/0060040 A1* | 3/2004 | Collard | 717/151 |

OTHER PUBLICATIONS

Bonachea, Dan. "Bulk File I/O Extensions to Java", Proceedings of the ACM 2000 Conference on Java Grande. Jun. 2000, pp. 16-25.*
Le, "An Out-of Order Execution Technique for Runtime Binary Translator", 1998, ACM, pp. 151-158.*
Weimin et al., "A Java Virtual Machine Design Based on Hybrid Concurrent Compliation Model", 2000, IEEE, pp. 18-23.*

* cited by examiner

*Primary Examiner*—Thomas Lee
*Assistant Examiner*—Jennifer N. To
(74) *Attorney, Agent, or Firm*—Duke W. Yee; Marilyn Smith Dawkins; Wayne P. Bailey

(57) ABSTRACT

An asynchronous execution process to allow a compiler or interpreter to recognize code elements that may be executed out of order and to create a light weight thread for execution of the code element. This light weight thread may be executed on another processor in a multiprocessing environment. An "async" keyword is included in a language to indicate that a statement may be executed asynchronously with respect to the other statements at the same nesting level. The "async" keyword may also be used to modify the declaration of a function to indicate that it is safe to run the affected method out of order with other statements in a block. An "async_end" keyword is included in a language to indicate that asynchronous execution of a statement, block of code, or method must be complete before the next statement, block of code, or method may be executed.

21 Claims, 4 Drawing Sheets

LANGUAGE EXTENSION FOR LIGHT WEIGHT THREADING IN A JVM

BACKGROUND OF THE INVENTION

1. Technical Field

The present invention relates to executing code in a Java virtual machine and, in particular, to running Java code in a multiprocessor environment. Still more particularly, the present invention provides a method, apparatus, and program for creating light weight threads and executing code asynchronously.

2. Description of Related Art

Java was originally developed in 1991 as a language for embedded applications such as those used in set-top boxes and other consumer-oriented devices. Unlike hypertext markup language (HTML), which is a document display format that is continually beefed up to make it do more, Java is a full-blown programming language like C and C++. Java allows for the creation of sophisticated client/server applications to be developed for the Web and for intranets.

A Java Virtual Machine (JVM) is software that interprets Java code. A JVM may include a just-in-time (JIT) compiler to compile code into machine code just before the code is run. In the case of Java, JIT compilers convert Java's intermediate language (bytecode) into native code at any time, before or after the code executes. A JVM is incorporated into a Web browser in order to execute Java applets. A JVM is also installed in a Web server to execute server-side Java programs. A JVM can also be installed in a client machine to run stand-alone Java applications.

Symmetric multiprocessing (SMP) is a multiprocessing architecture in which multiple CPUs, residing in one cabinet, share the same memory. SMP systems provide scalability. As business increases, additional CPUs may be added to absorb the increased transaction volume. SMP systems may range from two to as many as 32 or more processors. SMP speeds up whatever processes can be overlapped. For example, in a desktop computer, SMP can speed up the running of multiple applications simultaneously. If an application is multithreaded, which allows for concurrent operations within the application itself, then SMP will improve the performance of that single application.

An SMP system will only perform concurrent operations within an application if the programmer expressly writes the application to create multiple threads. However, hardware development in the processor space is becoming increasingly radical, calling for execution of code and allocation of resources to be controlled in the processor space. Yet, the intentions of software developers may get lost in the execution of code. Therefore, it would be advantageous to provide a method, apparatus, and program for creating light weight threads and executing code asynchronously.

SUMMARY OF THE INVENTION

The present invention provides a mechanism for indicating that a statement, block of code, or method is safe to execute out of order. The present invention introduces an "async" keyword that may be used to indicate that a statement may be executed asynchronously with respect to the other statements at the same nesting level. The "async" keyword may also be used to modify the declaration of a function. This usage tells the language compiler or interpreter that it is safe to run the affected method out of order with other statements in a block. When the compiler or interpreter encounters a statement or block of code that may be executed asynchronously, a light weight thread may be created to execute the code. This light weight thread may be executed on another processor in a multiprocessing environment. The present invention also introduces an "async_end" keyword that may be used to indicate that asynchronous execution of a statement, block of code, or method must be complete before the next statement, block of code, or method may be executed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
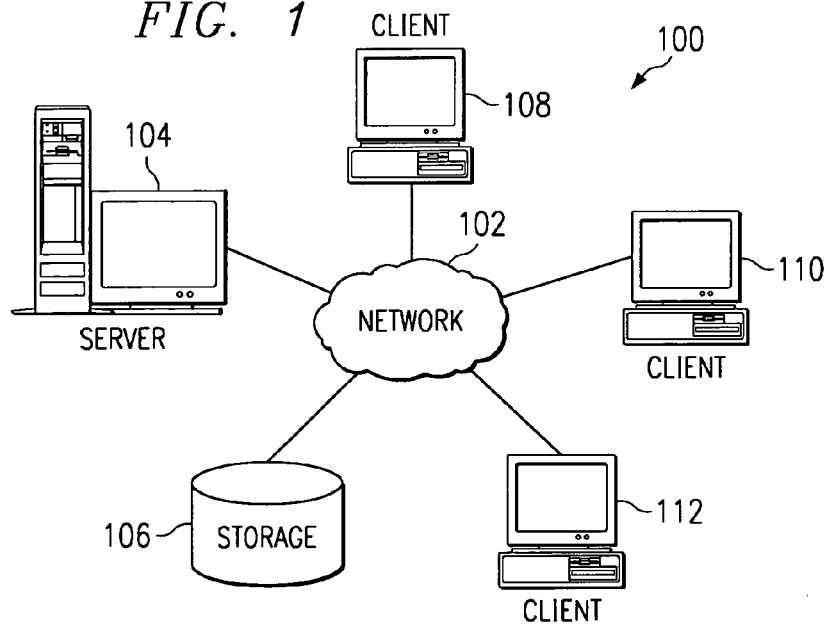
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
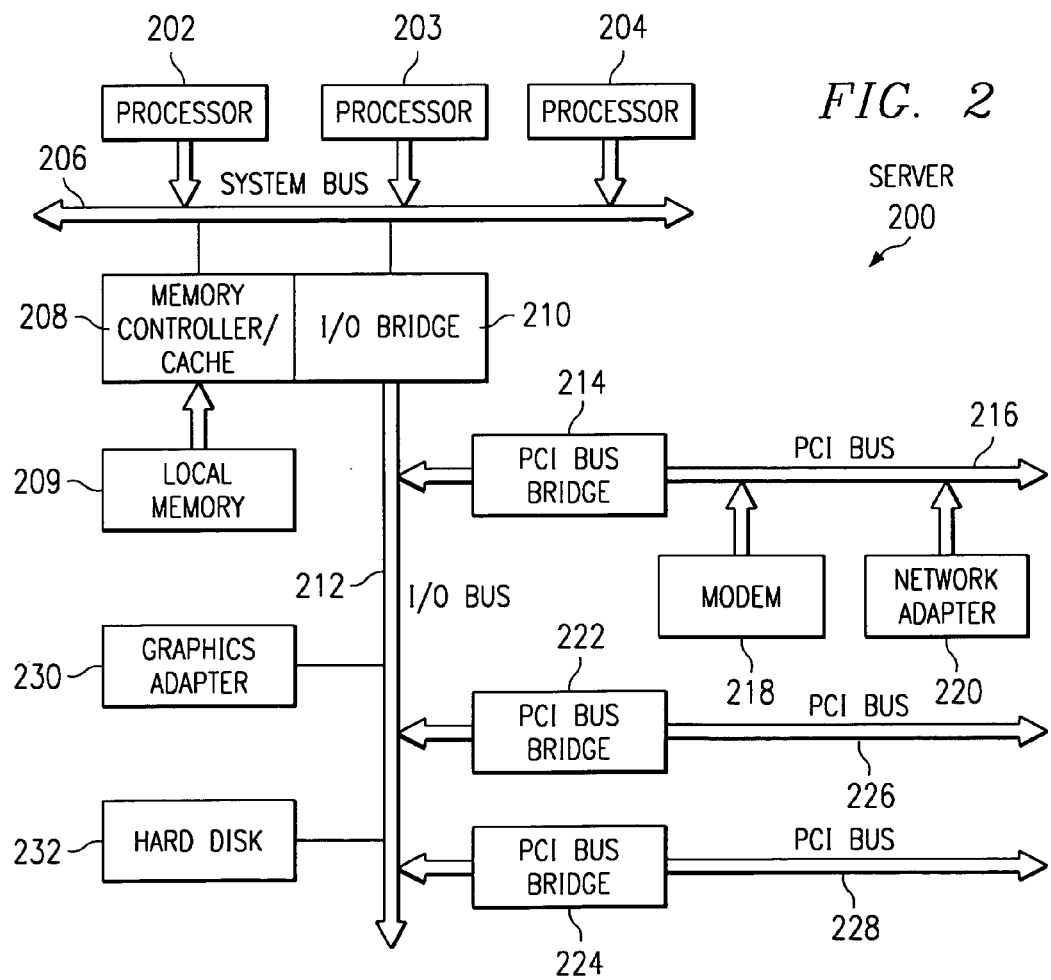
FIG. 2 is a block diagram of a data processing system that may be implemented as a server or a client in accordance with a preferred embodiment of the present invention.

Referring to FIG. 2, a block diagram of a data processing system that may be implemented as a server, such as server 104 in FIG. 1, or a client, such as one of clients 108, 110, 112 in FIG. 1, is depicted in accordance with a preferred embodiment of the present invention. Data processing system 200 may be a symmetric multiprocessor (SMP) system including a plurality of processors 202, 203, 204 connected to system bus 206. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 232, and may be loaded into local memory 209 for execution by processors 202, 203, 204.

Figure 3:
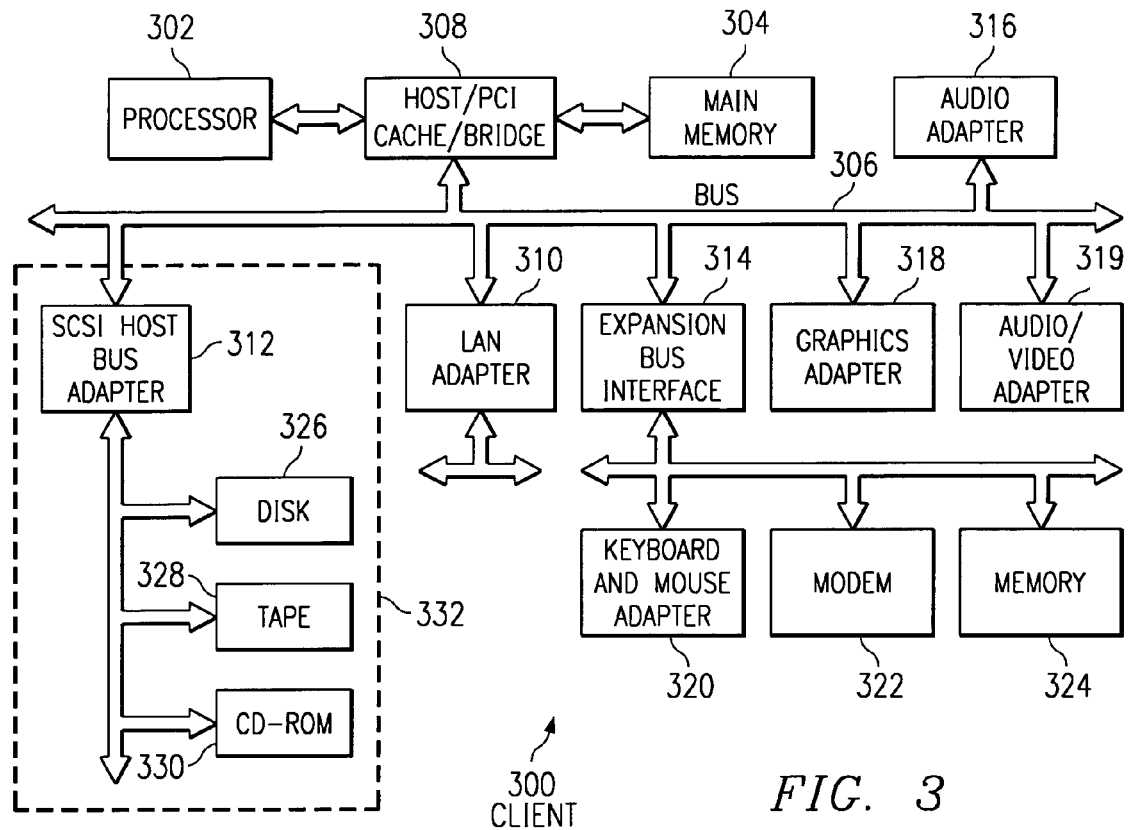
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk, a Web appliance, or telephony device.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

In the prior art, JVMs and operating systems only take advantage of multiple processors in a process if multiple threads are used. For example, an SMP machine may run a JVM with code loaded. By default, it is assumed that all statements are executed in the order written and, further, that whatever the effect of a given statement, the execution is finished before the beginning of the next statement. The present invention provides a mechanism for indicating that a statement, block of code, or method is safe to execute out of order. The present invention introduces an "async" keyword that may be used to indicate that a statement may be executed out of order with respect to the other statements at the same nesting level. A nesting level is the depth in which blocks are nested. A block is a logical grouping of executable code. For notation, the convention that a block is enclosed by curly braces is used herein. Thus, "{ . . . }" represents a block of code and, for example, "{ . . . { . . . } . . . { . . . } . . . }" shows two blocks nested within an outer block. A method refers to a separately-defined and named block of executable code. A statement refers to one executable language construct. A statement may represent a single instruction, a block, or a method.

The "async" keyword may also be used to modify the declaration of a function. This usage tells the language compiler or interpreter that it is safe to run the affected method out of order with other statements in a block. When the compiler or interpreter encounters a statement or block of code that may be executed asynchronously, a light weight thread may be created to execute the code. This light weight thread may be executed on another processor in a multiprocessing environment. While the examples herein use the keyword "async", other keywords may be used.

With reference now to FIGS. 4A–4E, examplary methods running in a JVM are illustrated in accordance with a preferred embodiment of the present invention. Particularly, with respect to FIG. 4A, JVM 402 loads method 404 and runs the method in Thread 1 406. In this method, the asynchronous execution process of the present invention determines that "foo1" must execute before "foo2", but "bar" may be executed out of order. Therefore, a light weight thread, Thread 2 408, is created to execute the statement "bar", while "foo1" and "foo2" are executed in Thread 1.

Figure 4A:
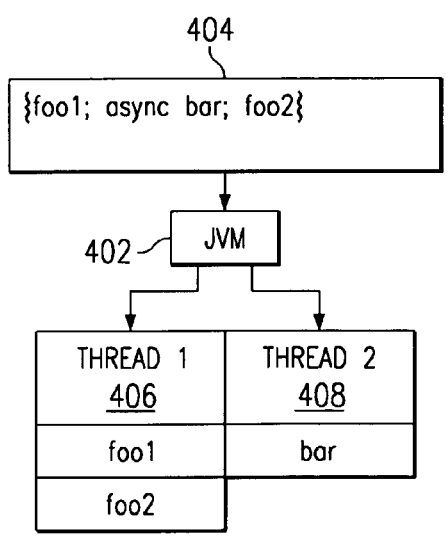
FIGS. 4A–4E are examplary methods running in a JVM in accordance with a preferred embodiment of the present invention.
Figure 4B:
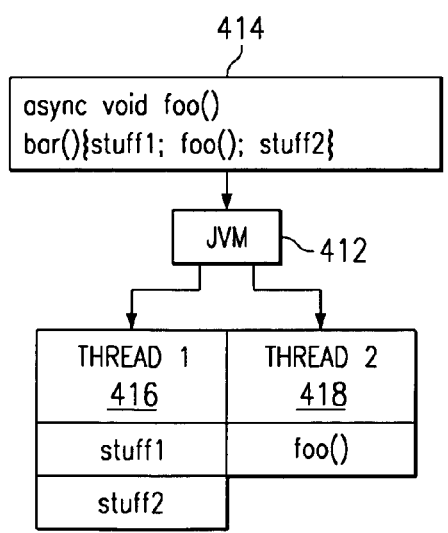

Turning now to FIG. 4B, JVM 412 loads method 414 and runs the method in thread 1 416. In this method, the asynchronous execution process of the present invention determines that the declaration of method "foo( )" indicates that "foo( )" may be executed out of order. In the block of code for "bar( )", "stuff1" must be executed before "stuff2"; however, as indicated in the declaration of the method, "foo( )" may be executed out of order. Therefore, a light weight thread, Thread 2 418, is created to execute the method "foo( )", while "stuff1" and "stuff2" are executed in Thread 1.

Figure 4C:
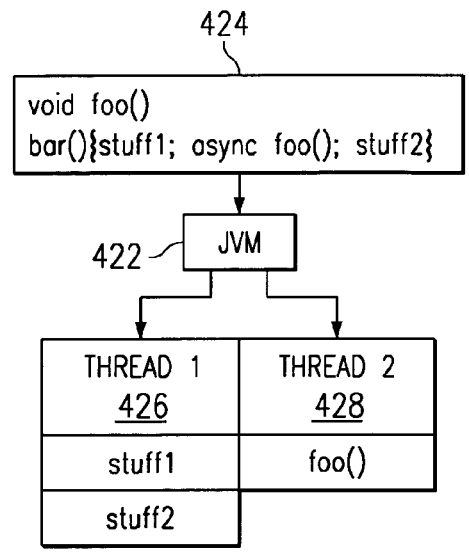

With reference now to FIG. 4C, JVM 422 loads method 424 and runs the method in thread 1 426. In this method, the asynchronous execution process of the present invention determines that in the block of code for "bar( )", "stuff1" must be executed before "stuff2"; however, the method "foo( )" may be executed out of order. Therefore, a light weight thread, Thread 2 428, is created to execute the method "foo( )", while "stuff1" and "stuff2" are executed in Thread 1.

Figure 4D:
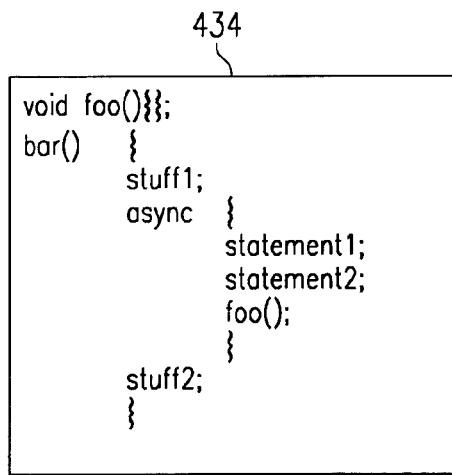

Further, with reference to FIG. 4D, JVM 432 loads method 434 and runs the method in thread 1 436. In this method, the asynchronous execution process of the present invention determines that in the block of code for "bar( )", "stuff1" must be executed before "stuff2"; however, the block of code deliniated by curly braces may be executed out of order. Therefore, a light weight thread, Thread 2 438, is created to execute the block of code including statements "statement1", "statement2", and "foo( )", while "stuff1" and "stuff2" are executed in Thread 1.

It is possible for the block of code to include statements that may be executed asynchronously with respect to the nesting level of that block. It is also possible for the block of code to have nested therein other blocks of code. In these cases, the asynchronous execution process of the present invention may execute recursively on the block of code. Alternatively, the asynchronous execution process of the present invention may execute on only the highest level depending on availability of resources.

In any system that may allow for asynchronous execution, it is important to determine when the asynchronous element will complete. This is called a synchronization point. Any asynchronous element must complete no later than the end of the execution of its enclosing block. In the example illustrated in FIG. 4B, "foo( )" must complete before "bar( )" returns to its caller. Again, using the example illustrated in FIG. 4B, in a statement "baz( ){bar( ); stuff}", "foo( )" will be completed before "stuff" executes, because "foo( )" must complete before "bar( )" returns. This is an implied synchronization point.

The present invention introduces an "async_end" keyword that may be used to indicate an explicit synchronization point. In other words, the "async_end" keyword indicates that asynchronous execution of a statement, block of code, or method must be complete before the next statement, block of code, or method may be executed.

Figure 4E:
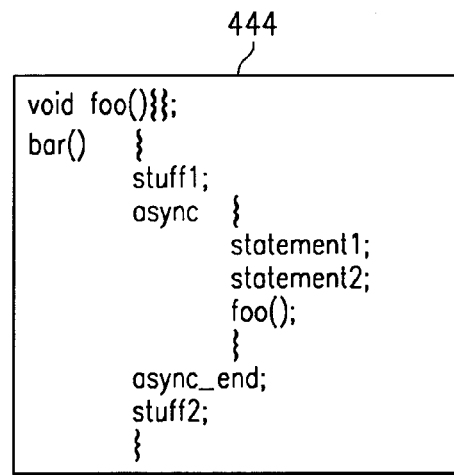
Figure 4E:
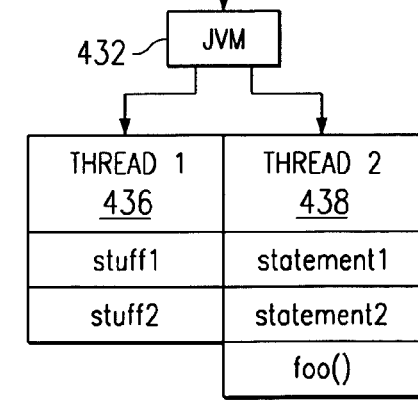
Figure 4E:
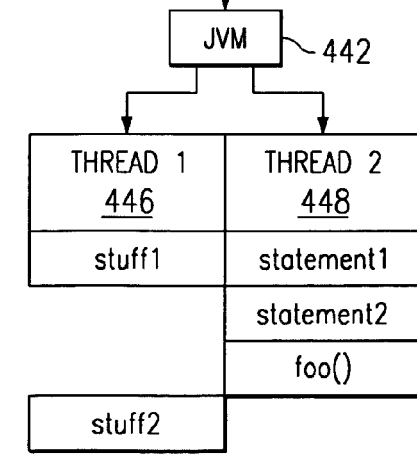

With reference to FIG. 4E, JVM 442 loads method 444 and runs the method in thread 1 446. In this method, the asynchronous execution process of the present invention determines that in the block of code for "bar( )", "stuff1" must be executed before "stuff2"; however, the block of code deliniated by curly braces may be executed out of order. Therefore, a light weight thread, Thread 2 448, is created to execute the block of code including statements "statement1", "statement2", and "foo( )", while "stuff1" and "stuff2" are executed in Thread 1. However, the "async_end" keyword before "stuff2" indicates that asynchronous execution of the block of code including statements "statement1", "statement2", and "foo( )" must complete before stuff2 may begin execution. Thus, stuff2 is not executed in Thread 1 until "foo( )" completes execution.

Figure 5:
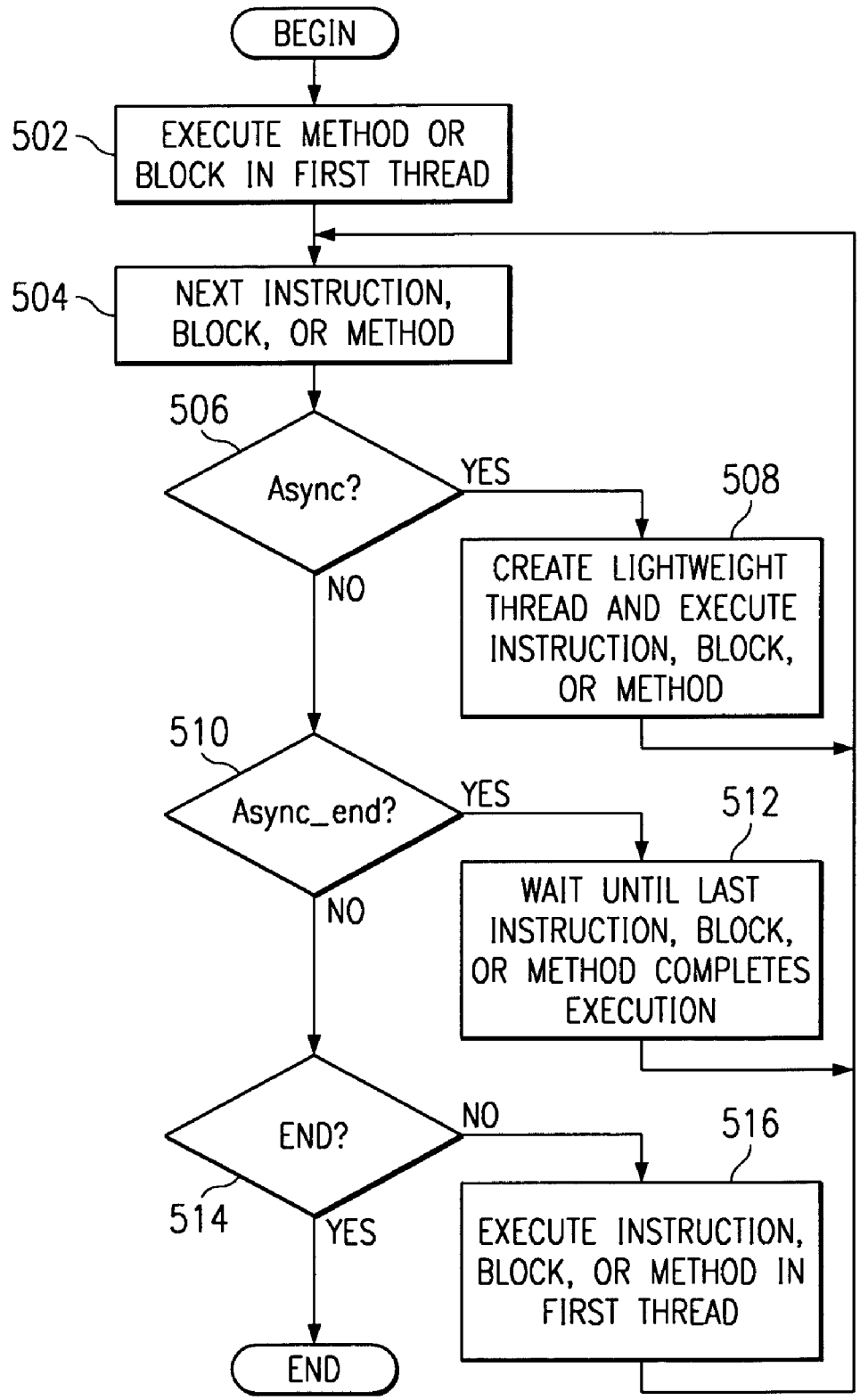
FIG. 5 is a flowchart of the operation of the asynchronous execution process in accordance with a preferred embodiment of the present invention.

Turning now to FIG. 5, a flowchart of the operation of the asynchronous execution process is shown in accordance with a preferred embodiment of the present invention. The process begins and executes the method in a first thread (step 502) and the next instruction, block or method is examined (step 504). A determination is made as to whether the asynchronous keyword is encountered or the next statement refers to a method that was declared as an asynchronous method (step 506). If the next code element is asynchronous, the process creates a light weight thread and executes the instruction, block, or method in the newly created thread (step 508) and returns to step 504 to examine the next code element.

As stated above, the block of code or method may include further statements that may be executed asynchronously with respect to the nesting level of that block or other blocks of code. In these cases, the asynchronous execution process of the present invention may execute recursively on the block of code or method. Alternatively, the asynchronous execution process of the present invention may execute on only the highest level depending on availability of resources.

If the code element is not asynchronous in step 506, a determination is made as to whether the "async_end" keyword is encountered (step 510). If the "async_end" keyword is encounterd, the process waits until the last asynchronous code element in the nesting level completes asynchronous execution (step 512) and returns to step 504 to examine the next code element.

If the "async_end" keyword is not encountered in step 510, a determination is made as to whether the end of the method or block of code is reached (step 514). If the end of the method or block of code is reached, the process ends.

Otherwise, the process executes the next instruction, block of code, or method in the current thread (step 516) and returns to step 504 to examine the next code element. Again, the statement may refer to a block of code or method that may include further statements that may be executed asynchronously with respect to the nesting level of that block or other blocks of code. In these cases, the asynchronous execution process of the present invention may execute recursively on the block of code or method.

For backwards compatibility or for systems which do not support threads, the "async" keyword may be implemented as a null operation or "no-op". That is, having "async" may have no effect. If this is the case, then "async_end" is also a no-op. If, however, "async" is implemented to allow for asynchronous operation, then synchronization semantics must be implemented as specified.

The "async" keyword may also use a parameter, which specifies a particular processor on an SMP system or similar multiprocessing system. On single-processor systems, runtime implementations may start a pool of worker threads in the execution process or in the kernel of the operating system. The runtime may then use the parameter to assign the code blocks to these threads appropriately. Thus, a multi-tasking program can be created without the programmer actually creating a thread in the code.

Thus, the present invention solves the disadvantages of the prior art by providing an asynchronous execution process to allow a compiler or interpreter to recognize code elements that may be executed out of order and to create a light weight thread for execution of the code element. This light weight thread may be executed on another processor in a multiprocessing environment. An "async" keyword is included in a language to indicate that a statement may be executed asynchronously with respect to the other statements at the same nesting level. The "async" keyword may also be used to modify the declaration of a function to indicate that it is safe to run the affected method out of order with other statements in a block. An "async_end" keyword is included in a language to indicate that asynchronous execution of a statement, block of code, or method must be complete before the next statement, block of code, or method may be executed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, while the examples shown herein employ the Java programming language, other languages may be used, in which case light weight threads may be created by the runtime or the operating system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a multiprocessor data processing system for asynchronous execution within a program, comprising:
   executing code in a first thread in a first processor of the multiprocessor data processing system;
   during the executing of the code, determining whether a first keyword exists in the code, the first keyword being a flag indicating that a subsequent code element following the first keyword may be executed out of order; and
   executing the subsequent code element in a second thread in a second processor of the multiprocessor data processing system if the flag indicates that the subsequent code element may be executed out of order, such that the code and the subsequent code element are executed asynchronously with respect to one another.

2. The method of claim 1, wherein the subsequent code element is one of an instruction, a block, and a method.

3. The method of claim 1, wherein the first keyword is usable in both an internal definition of a method and a type definition for the method.

4. The method of claim 1, wherein the method is executed by a run-time interpreter.

5. The method of claim 4, wherein the run-time interpreter is a Java virtual machine.

6. The method of claim 1, wherein the second thread is a light weight thread.

7. A method in a multiprocessor data processing system for asynchronous execution within a program, comprising:
   executing code in a first thread in a first processor of the multiprocessor data processing system;
   determining whether a first keyword exists in the code, the first keyword indicating a code element that may be executed out of order;
   executing the code element in a second thread in a second processor of the multiprocessor data processing system if the first keyword indicates the code element may be executed out of order, such that the code and the code element are executed asynchronously with respect to one another;
   determining whether a second keyword exists in the code, the second keyword indicating that execution of the code element in the second thread must complete before a next code element immediately following the second keyword is executed; and
   executing the next code element in the first thread after execution of the code element in the second thread completes if the second keyword indicates that execution of the code element in the second thread must complete before the next code element immediately following the second keyword is executed.

8. The method of claim 7, further comprising:
   determining whether a third keyword exists in the code element, the third keyword indicating a statement that may be executed out of order; and
   executing the statement in a third thread.

9. An apparatus in a multiprocessor data processing system for asynchronous execution within a program, comprising:
   first execution means for executing, by the apparatus, code in a first thread;
   determination means for determining, by the apparatus, whether a first keyword exists in the code, the first keyword being a type definition for a subsequent code element indicating that the subsequent code element following the first keyword may be executed out of order; and second execution means for executing, by the apparatus, the subsequent code element in a second thread, such that the code and the subsequent code element are executed asynchronously with respect to one another.

10. The apparatus of claim 9, wherein the subsequent code element is a method.

11. The apparatus of claim 9, wherein the first keyword is usable in both an internal definition of a method and a type definition for the method.

12. The apparatus of claim 9, wherein the first thread is executed on a first processor and the second thread is executed on a second processor.

13. The apparatus of claim 9, wherein the second thread is a light weight thread.

14. An apparatus in a multiprocessor data processing system for asynchronous execution within a program, comprising:

first execution means for executing, by the apparatus, code in a first thread;

determination means for determining, by the apparatus, whether a first keyword exists in the code, the first keyword indicating a code element that may be executed out of order;

second execution means for executing, by the apparatus, the code element in a second thread, such that the code and the code element are executed asynchronously with respect to one another;

means for determining, by the apparatus, whether a second keyword exists in the code, the second keyword indicating that execution of the code element in the second thread must complete before a next code element immediately following the second keyword is executed; and means for executing, by the apparatus, the next code element in the first thread after execution of the code element in the second thread completes.

15. The apparatus of claim 14, further comprising:

means for determining, by the apparatus, whether a third keyword exists in the code element, the third keyword indicating a statement that may be executed out of order; and means for executing, by the apparatus, the statement in a third thread.

16. An apparatus within a multiprocessor data processing system for asynchronous execution within a program, comprising:

an interpreter; and the program including (i) a first keyword indicating that a code element following the first keyword may be executed out of order, and (ii) at least one other code element, wherein the interpreter: (1) creates a first thread and executes the at least one other code element in the first thread to produce a first result, and (ii) upon detecting the first keyword, creates a light weight thread and executes the code element in the light weight thread to produce a second result, such that the code element executes asynchronously with respect to the at least one other code element within the program.

17. The apparatus of claim 16, wherein the interpreter is a Java virtual machine.

18. A computer program product, tangibly embodied in a recordable-type computer readable medium, for asynchronous execution within a program, comprising:

instructions for executing code in a first thread;

instructions for determining, during the executing of the code, whether a first keyword exists in the code, the first keyword being a flag indicating that a subsequent code element following the first keyword may be executed out of order; and instructions for executing the subsequent code element in a second thread, such that the code and the subsequent code element are executed asynchronously with respect to one another.

19. The computer program product of claim 18, wherein the first thread is executed on a first processor and the second thread is executed on a second processor.

20. A computer program product, tangibly embodied in a recordable-type computer readable medium, for asynchronous execution within a program, comprising:

instructions for executing code in a first thread;

instructions for determining whether a first keyword exists in the code, the first keyword indicating a code element that may be executed out of order;

instructions for executing the code element in a second thread, such that the code and the code element are executed asynchronously with respect to one another;

instructions for determining whether a second keyword exists in the code, the second keyword indicating that execution of the code element in the second thread must complete before a next code element immediately following the second keyword is executed; and instructions for executing the next code element in the first thread after execution of the code element in the second thread completes.

21. The computer program product of claim 20, further comprising:

instructions for determining whether a third keyword exists in the code element, the third keyword indicating a statement that may be executed out of order; and instructions for executing the statement in a third thread.

* * * * *